United States Patent
Derelöv et al.

(10) Patent No.: US 10,736,416 B2
(45) Date of Patent: Aug. 11, 2020

(54) PANELS COMPRISING A MECHANICAL LOCKING DEVICE AND AN ASSEMBLED PRODUCT COMPRISING THE PANELS

(71) Applicant: Välinge Innovation AB, Viken (SE)

(72) Inventors: Peter Derelöv, Helsingborg (SE); Johan Svensson, Nyvång (SE); Lars Gunnarsson, Åstorp (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 16/361,609

(22) Filed: Mar. 22, 2019

(65) Prior Publication Data
US 2019/0289999 A1    Sep. 26, 2019

(30) Foreign Application Priority Data
Mar. 23, 2018    (SE) ........................................ 1830096

(51) Int. Cl.
*A47B 47/00*    (2006.01)
*F16B 12/00*    (2006.01)
(Continued)

(52) U.S. Cl.
CPC ........ *A47B 47/042* (2013.01); *A47B 47/0066* (2013.01); *A47B 47/0075* (2013.01);
(Continued)

(58) Field of Classification Search
CPC . A47B 47/042; A47B 47/066; A47B 47/0075; F16B 12/26; F16B 12/125; F16B 12/46
See application file for complete search history.

(56) References Cited

U.S. PATENT DOCUMENTS

| 291,032 A | 1/1884 | Cleland |
| 634,581 A | 10/1899 | Miller |

(Continued)

FOREIGN PATENT DOCUMENTS

| CH | 365 507 A | 11/1962 |
| CH | 685 276 A5 | 5/1995 |

(Continued)

OTHER PUBLICATIONS

U.S. Appl. No. 15/956,949, **Derelöv.
(Continued)

*Primary Examiner* — Kimberley S Wright
(74) *Attorney, Agent, or Firm* — Buchanan Ingersoll & Rooney P.C.

(57) ABSTRACT

A set of panels including a first panel with a first main plane and a second panel with a second main plane. The first and the second panel include a mechanical locking device which is configured for locking a first edge of the first panel to a second edge of the second panel at a junction plane. The first main plane is essentially perpendicular to the second main plane and the junction plane is extending between the first main plane and the second main plane. The mechanical locking device includes at the first edge an edge tongue which extends from the junction plane and at the second edge includes an edge groove at the junction plane. The mechanical locking device includes a dowel at the first edge and a dowel groove at the second edge. The dowel is configured to cooperate with the dowel groove.

13 Claims, 10 Drawing Sheets

(51) Int. Cl.
*A47B 47/04* (2006.01)
*F16B 12/46* (2006.01)
*F16B 12/26* (2006.01)
*F16B 12/10* (2006.01)
*A47B 95/00* (2006.01)

(52) U.S. Cl.
CPC .............. *F16B 12/26* (2013.01); *F16B 12/46* (2013.01); *A47B 2095/006* (2013.01); *F16B 2012/103* (2013.01)

(56) References Cited

U.S. PATENT DOCUMENTS

| | | | |
|---|---|---|---|
| 701,000 A | 5/1902 | Ahrens | |
| 861,911 A | 7/1907 | Stewart | |
| 881,673 A | 3/1908 | Ellison | |
| 1,533,099 A * | 4/1925 | Carroll | E06B 3/9845 403/231 |
| 1,534,468 A | 4/1925 | Shea, Jr. | |
| 1,800,386 A | 4/1931 | Hoffman | |
| 1,800,387 A | 4/1931 | Greist | |
| 1,802,245 A | 4/1931 | Foretich | |
| 1,954,242 A | 4/1934 | Heppenstall | |
| 2,360,451 A | 10/1944 | Stone | |
| 2,362,904 A | 11/1944 | Kramer | |
| 2,496,184 A | 1/1950 | Von Canon | |
| 2,681,483 A * | 6/1954 | Morawetz | E04B 1/6133 403/14 |
| 3,002,630 A | 10/1961 | Heisser | |
| 3,195,968 A | 7/1965 | Freeman | |
| 3,284,152 A | 11/1966 | Schörghuber | |
| 3,313,054 A | 4/1967 | Madey | |
| 3,347,610 A | 10/1967 | Pilliod | |
| 3,410,441 A | 11/1968 | Rhyne | |
| 3,722,704 A | 3/1973 | Piretti | |
| 3,722,971 A | 3/1973 | Zeischegg | |
| 3,742,807 A | 7/1973 | Manning | |
| 3,765,465 A | 10/1973 | Gulistan | |
| 3,784,271 A | 1/1974 | Schreiber | |
| 3,884,002 A | 5/1975 | Logie | |
| 3,885,845 A | 5/1975 | Krieks | |
| 3,981,118 A | 9/1976 | Johnson et al. | |
| 4,089,614 A | 5/1978 | Harley | |
| 4,099,887 A | 7/1978 | Mackenroth | |
| 4,116,510 A | 9/1978 | Franco | |
| 4,142,271 A | 3/1979 | Busse | |
| 4,211,379 A | 7/1980 | Morgan et al. | |
| 4,222,544 A | 9/1980 | Crowder | |
| 4,279,397 A | 7/1981 | Larsson | |
| 4,299,067 A | 11/1981 | Bertschi | |
| 4,308,961 A | 1/1982 | Kunce | |
| 4,324,517 A | 4/1982 | Dey | |
| 4,403,886 A | 9/1983 | Haeusler | |
| 4,405,253 A | 9/1983 | Stockum | |
| 4,509,648 A | 4/1985 | Govang | |
| 4,593,734 A | 6/1986 | Wallace | |
| 4,595,105 A | 6/1986 | Gold | |
| 4,597,122 A | 7/1986 | Handler | |
| 4,615,448 A | 10/1986 | Johnstonbaugh | |
| 4,629,076 A | 12/1986 | Amstutz et al. | |
| 4,750,794 A | 6/1988 | Vegh | |
| 4,752,150 A | 6/1988 | Salice | |
| 4,815,908 A | 3/1989 | Duran et al. | |
| 4,817,900 A | 4/1989 | Whittington et al. | |
| 4,844,266 A | 7/1989 | Small et al. | |
| 4,883,331 A | 11/1989 | Mengel | |
| 4,886,326 A | 12/1989 | Kuzyk | |
| 4,888,933 A | 12/1989 | Guomundsson | |
| 4,891,897 A | 1/1990 | Gieske et al. | |
| 4,909,581 A | 3/1990 | Haheeb | |
| 4,938,625 A | 7/1990 | Matsui | |
| 4,944,416 A | 7/1990 | Petersen et al. | |
| 4,961,295 A | 10/1990 | Kosch, Sr. et al. | |
| 5,004,116 A | 4/1991 | Cattarozzi | |
| 5,018,323 A | 5/1991 | Clausen | |
| 5,109,993 A | 5/1992 | Hutchison | |
| 5,114,265 A | 5/1992 | Grisley | |
| 5,121,578 A | 6/1992 | Holz | |
| 5,125,518 A | 6/1992 | Ward | |
| 5,138,803 A | 8/1992 | Grossen | |
| 5,209,556 A | 5/1993 | Anderson | |
| 5,212,925 A | 5/1993 | McClinton | |
| 5,360,121 A | 11/1994 | Sothman | |
| 5,375,802 A | 12/1994 | Branham, II | |
| 5,423,155 A | 6/1995 | Bauer | |
| 5,451,102 A | 9/1995 | Chuan | |
| 5,458,433 A | 10/1995 | Statsny | |
| 5,471,804 A | 12/1995 | Winter, IV | |
| 5,475,960 A | 12/1995 | Lindal | |
| 5,499,667 A | 3/1996 | Nakanishi | |
| 5,499,886 A | 3/1996 | Short et al. | |
| 5,507,331 A | 4/1996 | Nakanishi | |
| 5,527,103 A | 6/1996 | Pittman | |
| 5,658,086 A | 8/1997 | Brokaw et al. | |
| 5,711,115 A | 1/1998 | Wirt | |
| 5,775,521 A | 7/1998 | Tisbo | |
| 5,810,505 A | 9/1998 | Henriott | |
| 5,893,617 A | 4/1999 | Lee | |
| 5,941,026 A | 8/1999 | Eisenreich | |
| 5,944,294 A | 8/1999 | Baer | |
| 5,950,389 A | 9/1999 | Porter | |
| 6,045,290 A * | 4/2000 | Nocievski | F16B 12/125 403/230 |
| 6,050,426 A | 4/2000 | Leurdijk | |
| 6,142,436 A | 11/2000 | Thurston et al. | |
| 6,312,186 B1 | 11/2001 | Röck et al. | |
| 6,363,645 B1 | 4/2002 | Hunter | |
| 6,413,007 B1 | 7/2002 | Lambright | |
| 6,418,683 B1 | 7/2002 | Martensson | |
| 6,491,172 B2 | 12/2002 | Chance | |
| 6,505,452 B1 | 1/2003 | Hannig | |
| 6,547,086 B1 | 4/2003 | Harvey | |
| 6,578,498 B1 | 6/2003 | Draudt et al. | |
| 6,675,979 B2 | 1/2004 | Taylor | |
| D486,676 S | 2/2004 | Campbell et al. | |
| 6,769,219 B2 | 8/2004 | Schwitte et al. | |
| 6,772,890 B2 | 8/2004 | Campbell et al. | |
| 6,827,028 B1 | 12/2004 | Callaway | |
| 6,971,614 B2 | 12/2005 | Fischer et al. | |
| 7,127,860 B2 | 10/2006 | Pervan | |
| 7,223,045 B2 | 5/2007 | Migli | |
| 7,228,977 B2 | 6/2007 | Perkins et al. | |
| 7,300,120 B2 | 11/2007 | Shin | |
| 7,451,535 B2 | 11/2008 | Wells et al. | |
| 7,451,578 B2 | 11/2008 | Hannig | |
| 7,584,583 B2 * | 9/2009 | Bergelin | E04F 15/02 52/588.1 |
| 7,614,350 B2 | 11/2009 | Tuttle et al. | |
| 7,621,092 B2 * | 11/2009 | Groeke | E04F 15/02 52/582.1 |
| 7,641,414 B1 | 1/2010 | Joyce | |
| 7,717,278 B2 | 5/2010 | Kao | |
| 7,721,503 B2 | 5/2010 | Pervan et al. | |
| 7,793,450 B2 | 9/2010 | Chasmer et al. | |
| 7,818,939 B2 | 10/2010 | Bearinger | |
| 7,998,549 B2 | 8/2011 | Susnjara | |
| 8,033,074 B2 | 10/2011 | Pervan | |
| 8,038,363 B2 | 10/2011 | Hannig | |
| 8,042,311 B2 | 10/2011 | Pervan | |
| 8,146,754 B2 | 4/2012 | Apgood | |
| 8,220,217 B2 | 7/2012 | Muehlebach | |
| 8,234,830 B2 | 8/2012 | Pervan | |
| 8,365,499 B2 | 2/2013 | Nilsson et al. | |
| 8,387,327 B2 | 3/2013 | Pervan | |
| 8,464,408 B2 | 6/2013 | Hazzard | |
| 8,495,849 B2 | 7/2013 | Pervan | |
| 8,505,257 B2 | 8/2013 | Boo et al. | |
| 8,544,230 B2 | 10/2013 | Pervan | |
| 8,596,013 B2 | 12/2013 | Boo | |
| 8,602,227 B1 | 12/2013 | McDonald | |
| 8,615,952 B2 | 12/2013 | Engström | |
| 8,713,886 B2 | 5/2014 | Pervan | |
| 8,745,952 B2 | 6/2014 | Perra | |
| 8,764,137 B2 | 7/2014 | Fehre | |

(56) References Cited

U.S. PATENT DOCUMENTS

| | | |
|---|---|---|
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 * | 11/2014 | Hakansson ........ A47B 47/0075 52/586.1 |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 * | 4/2018 | Derelov ................ F16B 12/125 |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,544,818 B2 | 1/2020 | Fridlund |
| 10,548,397 B2 | 2/2020 | Derelöv et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 * | 5/2006 | Pervan .................... E04F 15/02 52/591.1 |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 * | 10/2008 | Hannig ................ B27M 3/0066 52/592.1 |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 * | 9/2011 | Schulte .................... E04F 15/02 52/588.1 |
| 2011/0225922 A1 * | 9/2011 | Pervan .................... E04F 13/0894 52/588.1 |
| 2011/0280655 A1 * | 11/2011 | Maertens ............. A47B 47/042 403/375 |
| 2011/0283650 A1 * | 11/2011 | Pervan .................... E04F 15/02 52/588.1 |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 * | 11/2012 | Hakansson ........ A47B 47/0075 52/588.1 |
| 2012/0286637 A1 | 11/2012 | Fehre |
| 2013/0014463 A1 * | 1/2013 | Pervan ............. E04F 15/02038 52/588.1 |
| 2013/0048632 A1 | 2/2013 | Chen |
| 2013/0071172 A1 * | 3/2013 | Maertens ............. A47B 47/042 403/27 |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 * | 7/2013 | Cappelle ............. A47B 47/042 403/381 |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 * | 9/2014 | Sauer .................... F16B 12/125 403/375 |
| 2014/0294498 A1 | 10/2014 | Logan |
| 2015/0034522 A1 * | 2/2015 | Itou ...................... B65D 25/14 206/524.3 |
| 2015/0035422 A1 | 2/2015 | Håkansson et al. |
| 2015/0078807 A1 * | 3/2015 | Brannstrom ............ F16B 12/10 403/19 |
| 2015/0078819 A1 * | 3/2015 | Derelov ................. F16B 12/46 403/375 |
| 2015/0196118 A1 * | 7/2015 | Derelöv ................. F16B 5/0614 403/20 |
| 2015/0198191 A1 * | 7/2015 | Boo ....................... F16B 12/46 403/375 |
| 2015/0230600 A1 * | 8/2015 | Schulte ................ A47B 47/042 312/265.5 |
| 2015/0368896 A1 * | 12/2015 | Schulte .................... E04B 1/54 403/364 |
| 2016/0000220 A1 * | 1/2016 | Devos ................. A47B 47/042 403/363 |
| 2016/0007751 A1 | 1/2016 | Derelöv |
| 2016/0145029 A1 | 5/2016 | Ranade et al. |
| 2016/0174704 A1 * | 6/2016 | Boo .................... A47B 47/0075 312/265.5 |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 * | 3/2017 | Derelov ................. F16B 12/24 |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 * | 7/2017 | Derelov ............... A47B 47/042 |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 * | 6/2019 | Derelov ............. A47B 47/0075 |
| 2019/0195256 A1 | 6/2019 | Derelöv |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0069048 A1 | 3/2020 | Derelöv et al. |
| 2020/0069049 A1 | 3/2020 | Derelöv et al. |

(56) References Cited

U.S. PATENT DOCUMENTS

| | | | |
|---|---|---|---|
| 2020/0102978 A1 | 4/2020 | Fridlund | |
| 2020/0121076 A1 | 4/2020 | Derelöv et al. | |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 102917616 A | 2/2013 |
| CN | 203424576 U | 2/2014 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 517 187 A1 | 6/1983 |
| FR | 2 597 173 A1 | 10/1987 |
| FR | 2 602 013 A1 | 1/1988 |
| GB | 1 022 377 A | 3/1966 |
| GB | 2 163 825 A | 3/1986 |
| GB | 2 482 213 A | 1/2012 |
| GB | 2 520 927 A | 6/2015 |
| JP | S53-113160 U | 9/1978 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2017/131574 A1 | 8/2017 |
| WO | WO 2017/138874 A1 | 8/2017 |
| WO | WO 2018/080387 A1 | 5/2018 |
| WO | WO 2019/125291 A1 | 6/2019 |
| WO | WO 2019/125292 A1 | 6/2019 |

OTHER PUBLICATIONS

U.S. Appl. No. 16/386,732, **Boo.
U.S. Appl. No. 16/386,810, **Boo.
U.S. Appl. No. 16/386,824, **Boo.
U.S. Appl. No. 16/386,874, **Derelöv.
**Derelöv, Peter, U.S. Appl. No. 15/956,949 entitled "Panels for an Assembled Product", filed in the U.S. Patent and Trademark Office filed Apr. 19, 2018.
**Boo, Christian, U.S. Appl. No. 16/386,732 entitled "Set of Panels With a Mechanical Locking Device," filed in the U.S. Patent and Trademark Office filed Apr. 17, 2019.
**Boo, Christian, U.S. Appl. No. 16/386,810 entitled "Set of Panels With a Mechanical Locking Device," filed in the U.S. Patent and Trademark Office filed Apr. 17, 2019.
**Boo, Christian, U.S. Appl. No. 16/386,824 entitled "Set of Panels With a Mechanical Locking Device," filed in the U.S. Patent and Trademark Office filed Apr. 17, 2019.
**Derelöv, Peter, U.S. Appl. No. 16/386,874 entitled "Symmetric Tongue and T-Cross," filed in the U.S. Patent and Trademark Office filed Apr. 17, 2019.
U.S. Appl. No. 16/553,325, **Derelöv et al.
U.S. Appl. No. 16/553,350, **Derelöv et al.
U.S. Appl. No. 16/564,438, **Brännström et al.
U.S. Appl. No. 16/567,436, **Derelöv et al.
International Search Report/Written Opinion dated Jun. 4, 2019 in PCT/SE2019/050259, ISA/SE, Patent-och registreringsverket, Stockholm, SE, 12 pages.
**Derelöv, Peter, et al., U.S. Appl. No. 16/553,325 entitled "Set of Panels with a Mechanical Locking Device," filed in the U.S. Patent and Trademark Office filed Aug. 28, 2019.
**Derelöv, Peter, et al., U.S. Appl. No. 16/553,350 entitled "Set of Panels with a Mechanical Locking Device," filed in the U.S. Patent and Trademark Office filed Aug. 28, 2019.
**Brännström, Hans, et al., U.S. Appl. No. 16/564,438 entitled "Assembled Product and a Method of Assembling the Assembled Product," filed in the U.S. Patent and Trademark Office filed Sep. 9, 2019.
**Derelöv, Peter, et al., U.S. Appl. No. 16/567,436 entitled "Panels Comprising a Mechanical Locking Device and an Assembled Product Comprising the Panels," filed in the U.S. Patent and Trademark Office filed Sep. 11, 2019.
U.S. Appl. No. 16/663,603, **Fridlund.
U.S. Appl. No. 16/697,335, **Boo et al.
**Fridlund, Magnus, U.S. Appl. No. 16/663,603 entitled "Element and Method for Providing Dismantling Groove," filed in the U.S. Patent and Trademark Office filed Oct. 25, 2019.

(56) References Cited

OTHER PUBLICATIONS

\*\*Boo, Christian, et al., U.S. Appl. No. 16/697,335 entitled "Panels Comprising a Mechanical Locking Device and an Assembled Product Comprising the Panels," filed in the U.S. Patent and Trademark Office filed Nov. 27, 2019.
U.S. Appl. No. 16/703,077, \*\*Fridlund.
U.S. Appl. No. 16/722,096, \*\*Derelöv et al.
\*\*Fridlund, Magnus, U.S. Appl. No. 16/703,077 entitled "Set of Panels for an Assembled Product," filed in the U.S. Patent and Trademark Office filed Dec. 4, 2019.
\*\*Derelöv, Peter, et al., U.S. Appl. No. 16/722,096 entitled "Panels Comprising a Mechanical Locking Device and an Assembled Product Comprising the Panels," filed in the U.S. Patent and Trademark Office filed Dec. 20, 2019.
U.S. Appl. No. 16/861,639, Derelöv.
\*\*Derelöv, Peter, U.S. Appl. No. 16/861,639 entitled "Panels Comprising a Mechanical Locking Device and an Assembled Product Comprising the Panels," filed in the U.S. Patent and Trademark Office on Apr. 29, 2020.

\* cited by examiner

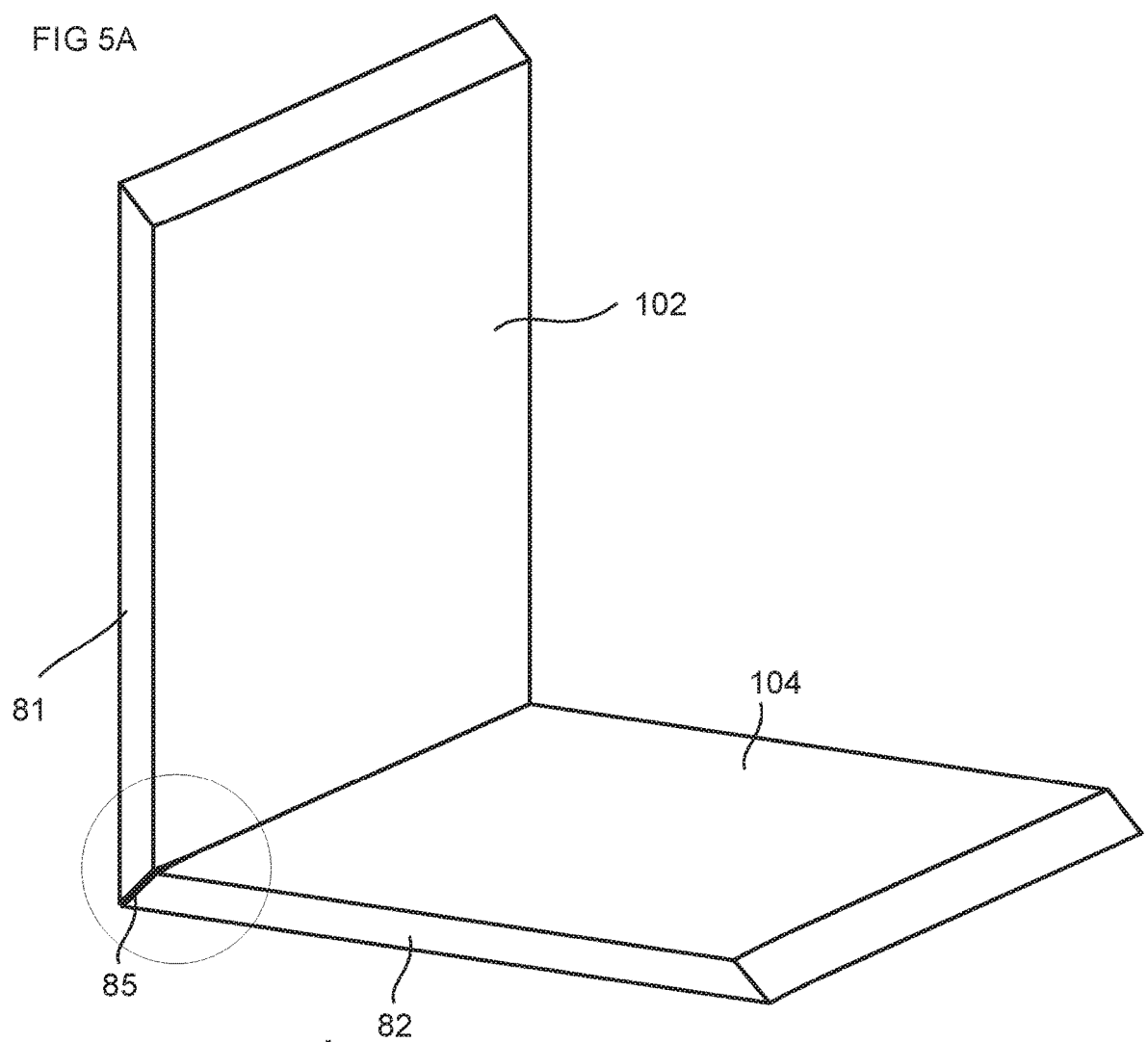
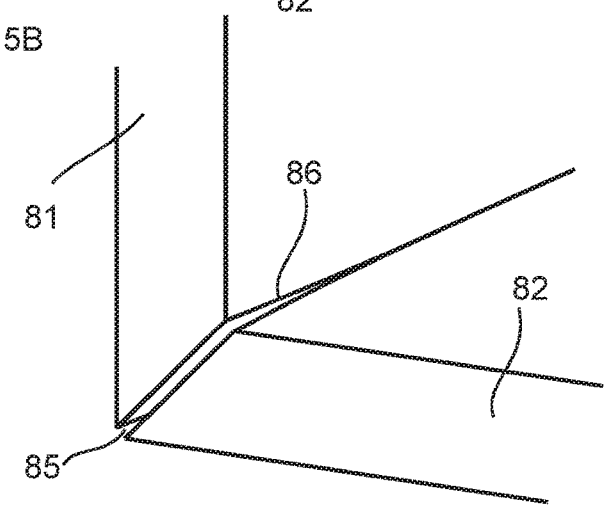

PANELS COMPRISING A MECHANICAL LOCKING DEVICE AND AN ASSEMBLED PRODUCT COMPRISING THE PANELS

CROSS REFERENCE TO RELATED APPLICATIONS

The present application claims the benefit of Swedish Application No. 1830096-2, filed on Mar. 23, 2018. The entire contents of Swedish Application No. 1830096-2 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise a flexible tongue.

BACKGROUND

A furniture product provided with a mechanical locking device is known in the art, as evidenced by WO 2017/131574. The furniture comprises a first panel connected perpendicular to a second panel by a mitre joint which includes a mechanical locking device.

SUMMARY

One object of certain embodiments of the present invention is to provide an improvement over the above described technique and the known art. A specific objective is to improve assembling of panels, such as furniture panels, locked together by a mechanical locking device and to increase the strength of the mechanical locking device or reduce visible gaps in the joint. The panels may be a part of a furniture product, such as a furniture component, a drawer, a cupboard, a bookshelf, a wardrobe, a kitchen fixture, or a box. At least some of these and other objects and advantages that will be apparent from the description have been achieved by a first aspect of the invention that includes a set of panels comprising a first panel with a first main plane and a second panel with a second main plane. The first panel and the second panel comprise a mechanical locking device which is configured for locking a first edge of the first panel to a second edge of the second panel at a junction plane. The first main plane is essentially perpendicular to the second main plane and the junction plane is extending between the first main plane and the second main plane. The mechanical locking device comprises: at the first edge, an edge tongue which extends from the junction plane; and, at the second edge, an edge groove at the junction plane, wherein the edge tongue is configured to cooperate with the edge groove for locking together the first and the second edges in a first direction which is perpendicular to the first main plane. The mechanical locking device further comprises a dowel at the first edge and a dowel groove at the second edge. The dowel is configured to cooperate with the dowel groove. A centreline of the dowel is positioned at a first distance in the first direction from an outer corner of the first panel. The dowel groove is positioned at a second distance in the first direction from an outer corner of the second panel. The second distance is greater than the first distance.

The dowel and the dowel groove and their positions are configured such that the first edge is pressed against the second edge. This may have the effect that a gap at the junction plane is avoided or diminished when the first edge and/or the second edge have/has a curved shape. Such a gap is particularly undesired at the front edges of the panels.

A difference between the second distance and the first distance may be within the range of about 0.1 mm to about 0.5 mm, or is about 0.3 mm.

The dowel may be attached to another dowel groove at the first edge.

The dowel may be attached to the dowel groove at the second edge before the first and the second panels are assembled and locked together with the mechanical locking device.

Thus, the dowel is in this embodiment inserted in said another dowel groove, at the first edge, during the assembling.

The dowel may be of a cylindrical shape.

The dowel may comprise locking elements, such as flanges, barbs or ribs.

The dowel may be made from one or more of a wood based material, a polymer material, preferably with a reinforcement, such as glass fibre or a metal.

The edge tongue may be formed of a core material of the first panel and/or the edge groove may be formed of a core material of the second panel.

The edge tongue may comprise a tongue groove and the edge groove may comprise a flexible tongue, preferably arranged in an insertion groove, and wherein said flexible tongue is configured to cooperate with the tongue groove for locking together the first and the second edges in a second direction which is perpendicular to the second main plane.

The angle between the junction plane and the first main plane may be about 45°.

The edge tongue may extend, from the junction plane, essentially in the second direction.

The edge tongue may extend along essentially the entire length of the first edge in a longitudinal direction of the first edge and ends at a distance from a front edge of the first panel.

The dowel may be positioned between the front edge of the first panel and the edge tongue.

The edge groove may extend along essentially the entire length of the second edge in a longitudinal direction of the second edge and ends at a distance from a front edge of the second panel.

The flexible tongue may be displaceable in the insertion groove.

A core material of the first and the second panel may comprise a wood fibre based board, such as a HDF, MDF, plywood, solid wood or particleboard, or a reinforced plastic board or a wood fibre composite board. The core may be provided with a decorative layer.

The locking device may comprise a bevel or rounding at an opening of the tongue groove. This may facilitate disassembling as the bevel or the rounding may prevent that the flexible tongue got stuck during the disassembling.

The locking device is preferably configured such that the flexible tongue moves out of the tongue groove when a tool is inserted into the tongue groove and pushed back into the insertion groove.

The first panel and the second panel are preferably configured to be assembled by displacing the first panel relative the second panel in the second direction, wherein the first panel is perpendicular to the second panel. The edge tongue is inserted into the edge groove, wherein the flexible tongue is pushed back into the insertion groove and springs back into the tongue groove to obtain a locked position.

The flexible tongue may be according to the flexible tongue described and shown in FIGS. 2A-2F or FIG. 3A-3B in WO 2015/105449. FIGS. 2A-2F or FIG. 3A-3B, and accompanying disclosure in the specification, in WO 2015/105449 are hereby expressly incorporated by reference.

The set of panels may be furniture panels.

A second aspect of the invention includes an assembled furniture product comprising a corner of a frame comprising the set of panels as described above.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which

FIG. 5A shows an embodiment of two panels assembled with a mitre joint.

FIG. 5B shows an enlargement of the encircled area in FIG. 5A.

DETAILED DESCRIPTION

Figure 1:
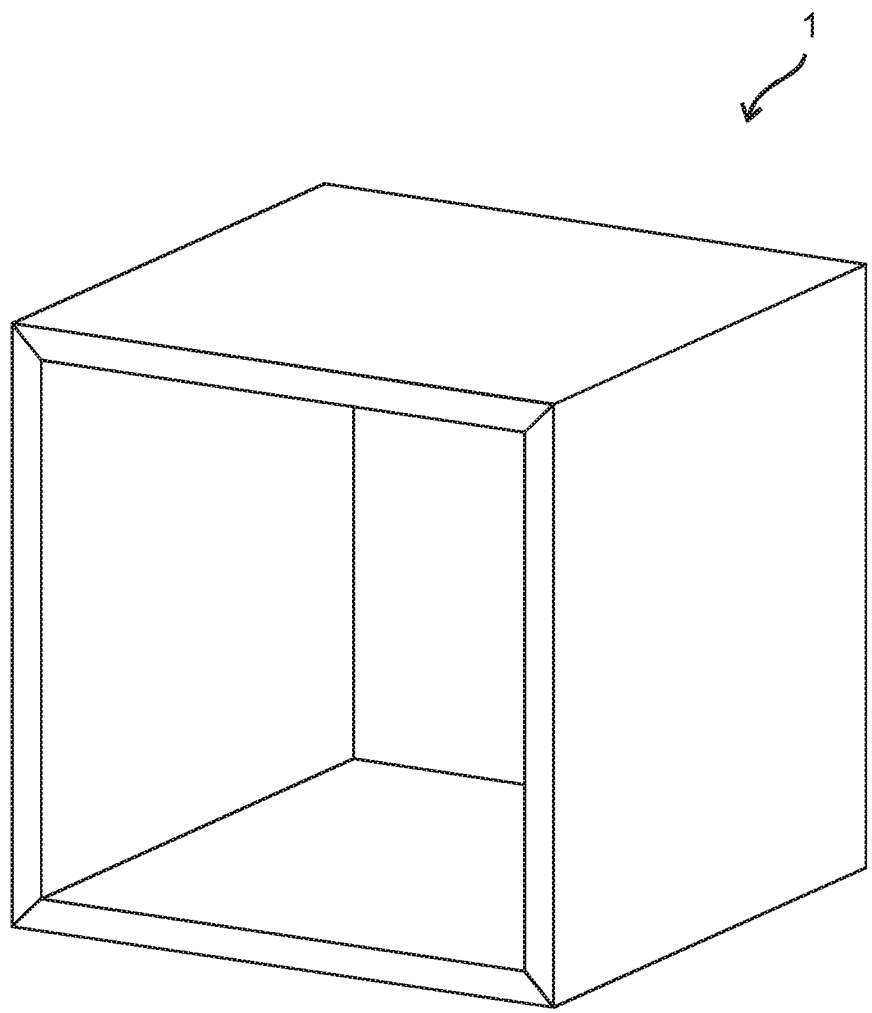
FIG. 1 shows an embodiment of an assembled furniture product

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

As used herein, the term "about" means ±10% of the noted value. By way of example only, a distance of "about 0.3 mm" could include from 0.27 mm to 0.33 mm.

An embodiment of an assembled product, such as a furniture product, comprising panels joined together with mitre joints is shown in FIG. 1.

Embodiments of the invention concern a set of panels, comprising a mechanical locking device, for an assembled product, such as illustrated in FIG. 1 in a 3D view.

Figure 2:
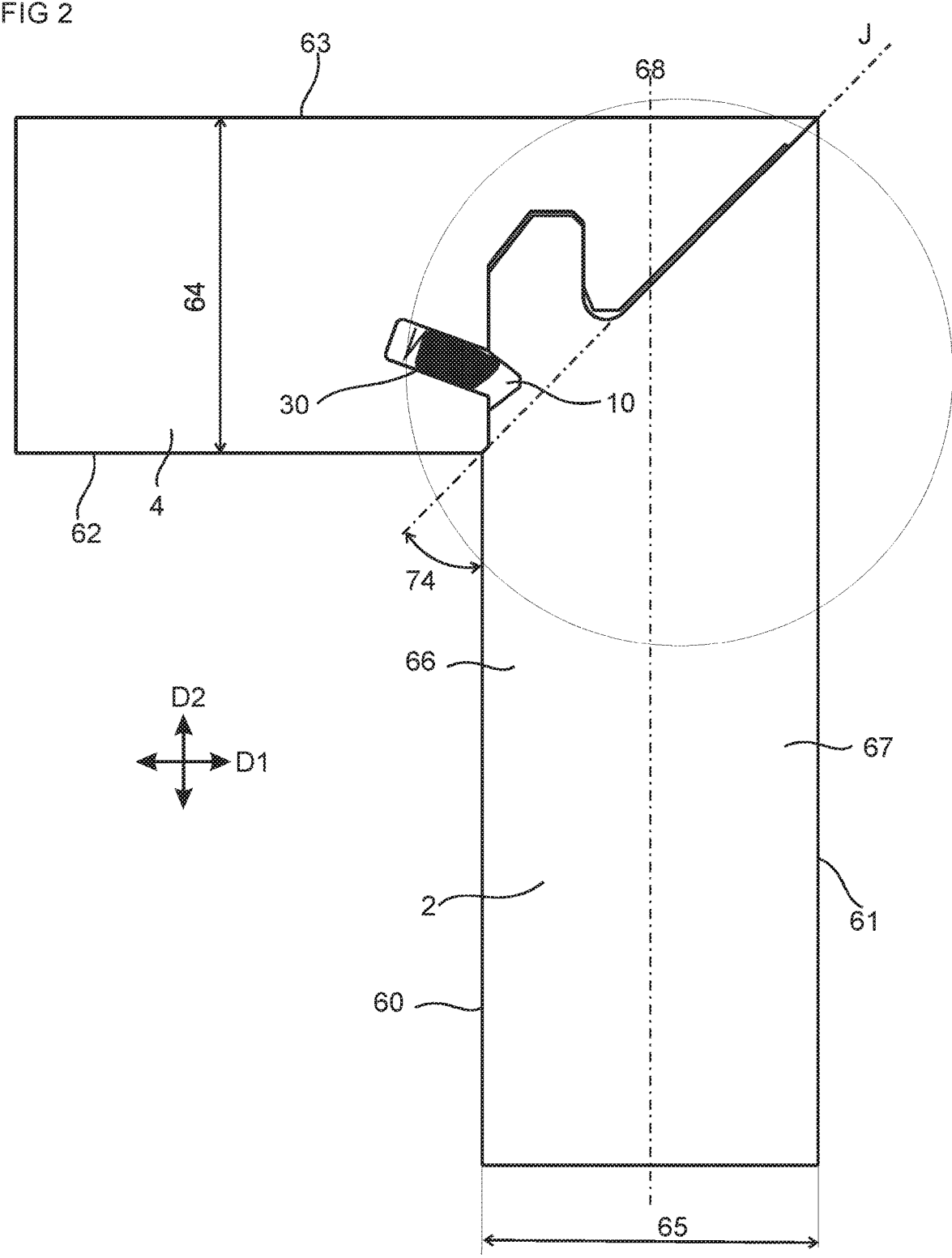
FIG. 2 shows an embodiment of the first panel and the second panel locked together with an embodiment of the mechanical locking device.
Figure 3:
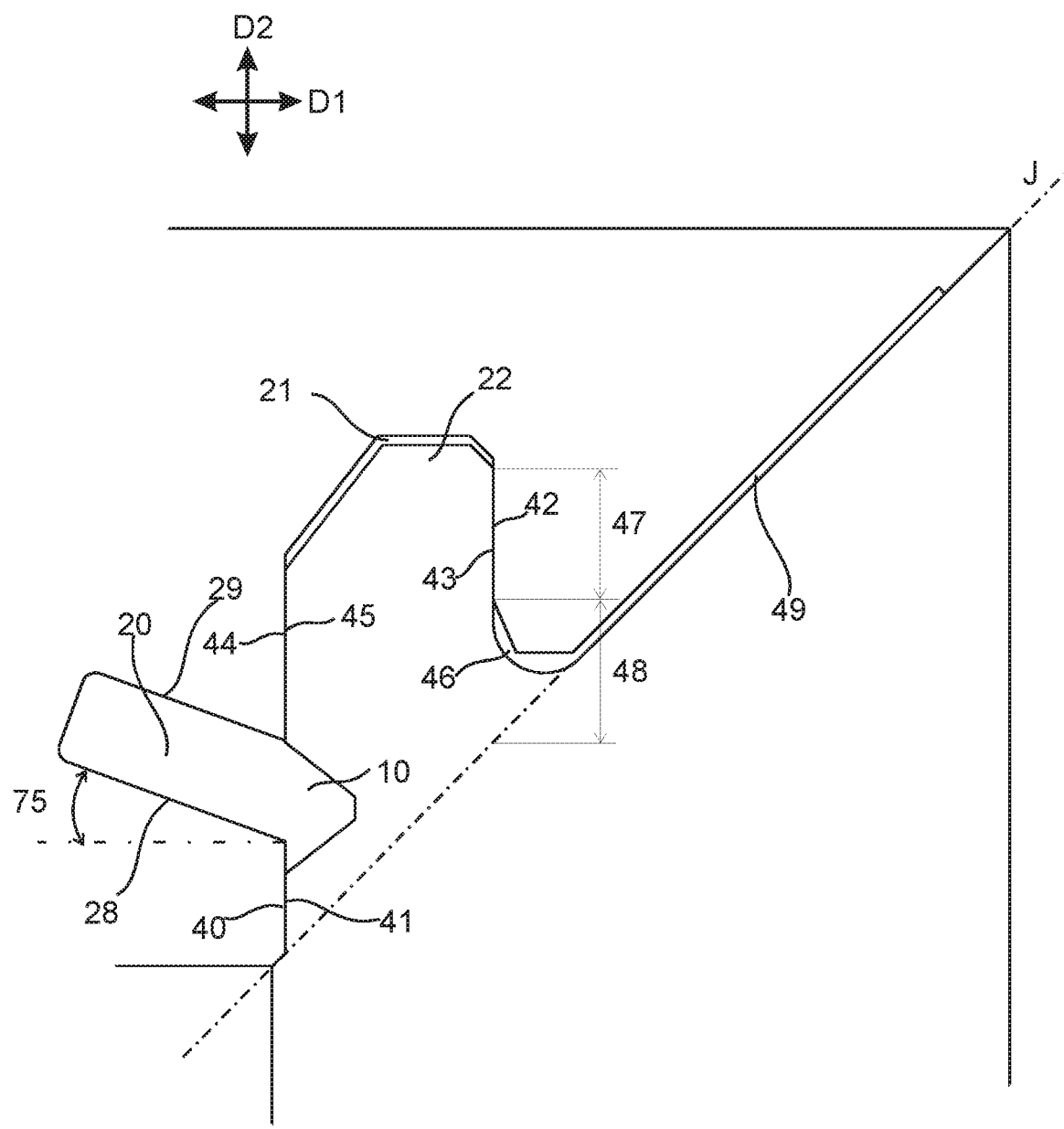
FIG. 3 shows an enlargement of the encircled area in FIG. 2 without the flexible tongue.

FIG. 2 shows an embodiment including a set of panels comprising a first panel 2 with a first main plane and a second panel 4 with a second main plane. FIG. 3 shows an enlargement of the encircled area in FIG. 2 without the flexible tongue. The first panel and the second panel are provided with a mechanical locking device for locking a first edge of the first panel 2 to a second edge of the second panel 4 at a junction plane J. The first main plane is essentially perpendicular to the second main plane and the junction plane is extending between the first main plane and the second main plane. The panels are shown in a locked position in a crosscut view. A longitudinal direction of the first edge and the second edge extends perpendicular to the view shown. The first edge comprises an edge tongue 22 that extends from the junction plane J. The second edge comprises an edge groove 21 at the junction plane, wherein the edge tongue is configured to cooperate with the edge groove for locking together the first and the second edges in a first direction D1 which is perpendicular to the first main plane.

The edge tongue 22 comprises a tongue groove 10. The edge groove 21 comprises a flexible tongue 30 arranged in an insertion groove 20, said flexible tongue is configured to cooperate with the tongue groove 10 for locking together the first and the second edges in a second direction D2 which is perpendicular to the second main plane.

The mechanical locking device may comprise a first space 46 between the edge tongue 22 and the edge groove 21 at an opening of the edge groove 21 and at the junction plane in a locked position of the first and the second edge. The first space 46 may have the advantage that a loading of a part of the second edge at the opening of the edge groove is avoided. This part of the second edge may be a weak part, since little material is available to absorb a load. The angle 74 between the junction plane and the first main plane may be about 45°. The edge tongue 22 preferably extends, from the junction plane, essentially in the second direction.

The first panel 2 has a first thickness 65 and the second panel 4 has a second thickness 64. The first and the second thickness may be essentially the same. The first panel 2 comprises an inner half 66, at a first side of a central plane 68 of the first panel, and an outer half 67, at second side of the central plane 68 of the first panel, in a direction of the thickness of the first panel. The entire edge tongue 22 is preferably at the inner half of the first panel. This may have the effect that more material is obtained between the edge groove 21 and an outer corner, in a locked position of the first and the second panel, which may increase the strength of the mechanical locking device. The first panel comprises an inner face 60 and an outer face 61. The second panel comprises an inner face 62 and an outer face 63.

FIG. 3 shows that a first side of the edge tongue 22 may comprise, at the junction plane J, a first locking surface 41, and the edge groove 21 may comprises, at the junction plane J, a second locking surface 40. The first locking surface and the second locking surface are essentially parallel and are configured to cooperate for locking in the first direction. The first locking surface and the second locking surface preferably extend essentially in the second direction. The edge tongue 22 at a second side, which is opposite the first side, may comprise a third locking surface 43 and the edge groove 21 may comprise a fourth locking surface 42, wherein the third locking surface and the fourth locking surface are essentially parallel and are configured to cooperate at a distance from the junction plane for locking in the first direction. The third locking surface and the fourth locking surface are preferably extending essentially in the second direction. Said parallel first, second, third and fourth locking surface may have the advantage that panels are easy to assemble and that, e.g., a furniture comprising said set of panels may be more stable. The fourth locking surface 42 is preferably closer to the central plane 68 than the second locking surface 40.

The third locking surface 43 and the fourth locking surface 42 may cooperate, to absorb a load, at an area extending over a first distance 47 in the second direction. The third locking surface and the fourth locking surface are preferably displaced from the junction plane by a second distance 48. This may have the effect that more material is obtained, in the first direction D1, between the fourth locking surface 42 and the junction plane, which may increase the strength of the mechanical locking device. The first distance 47 may be within the range of about 20% to about 200% of the second distance 48 or within the range of about 50% to about 150% of the second distance 48. The first 47 distance is essentially the same as the second distance 48 in the embodiment shown in FIG. 3.

The first side of the edge tongue 22, at a distance from the junction plane, may comprise a fifth locking surface 45 and the edge groove 21 may comprise a sixth locking surface 44 at a distance from the junction plane J. The fifth locking surface and the sixth locking surface are essentially parallel and are preferably configured to cooperate for locking in the first direction. The fifth locking surface and the sixth locking surface are preferably extending essentially in the second direction. The insertion groove 20 is, in the embodiment shown FIG. 3, positioned between the sixth locking surface 44 and the second locking surface 40. The tongue groove 10 may be positioned between the fifth locking surface 45 and the first locking surface 41.

The first panel 2 and the second panel 4 are preferably configured to be assembled by displacing the first panel 2 relative the second panel 4 in the second direction D2, wherein the first panel is perpendicular to the second panel. The edge tongue 22 is inserted into the edge groove 21, wherein the flexible tongue 30 is pushed back into the insertion groove and springs back into the tongue groove 10 to obtain a locked position. The set of panels may be furniture panels.

The insertion groove 20 may extend along essentially the entire length of the edge groove.

FIG. 5A shows panels 102, 104 that are joined with a mitre joint and FIG. 5B shows an enlargement of the encircled area in FIG. 5A. The panels 102, 104 may show a gap 85 at the mitre joint at the front edges 81, 82 of the panels if one of the panels has a curved shape 86 along an edge at the mitre joint. The panels may have obtained the curved shape due to a load and, e.g., wood based panels may have obtained the curved shape due to a humidity change.

Figure 6A:
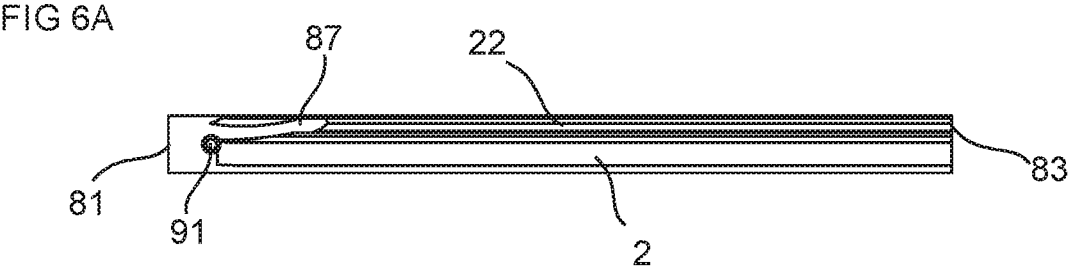
FIG. 6A shows an embodiment of the first panel in a bottom view.
Figure 6B:
FIG. 6B shows an embodiment of the first panel in a side view.
Figure 6C:
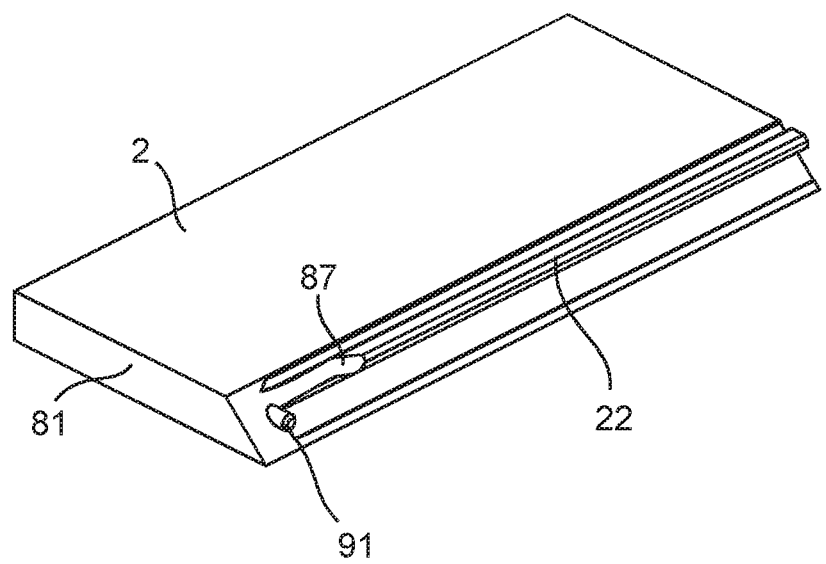
FIG. 6C shows an embodiment of the first panel in a 3D view.

FIG. 6A-C shows an embodiment of the first panel in a bottom view, in a side view, and in a 3D view, respectively. The embodiment of the first panel comprises an embodiment of the edge tongue 22 which extends along essentially the entire length of the first edge in a longitudinal direction of the first edge and ends at a front end 87 at a distance from a front edge 81 of the first panel 2. The dowel 91 may be positioned at distance from the front edge 81 of the first panel 2. The dowel 91 may be positioned between the front end 87 of the edge tongue 22 and the front edge 81 of the first panel 2.

Figure 7A:
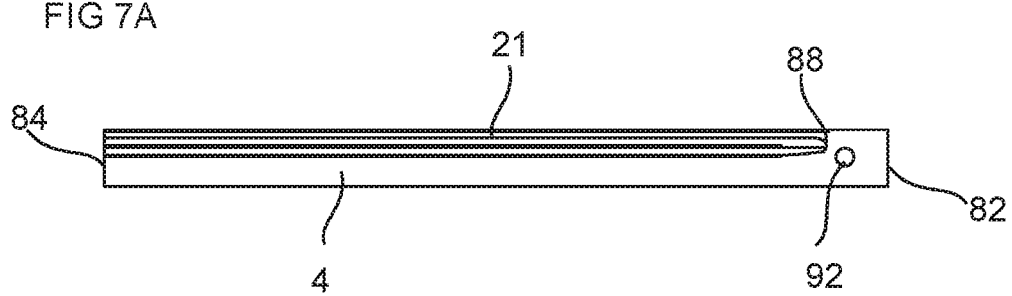
FIG. 7A shows an embodiment of the second panel in a bottom view.
Figure 7B:
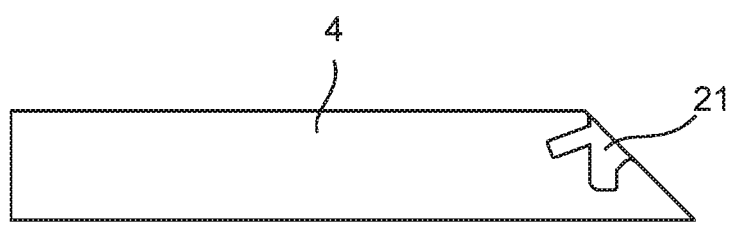
FIG. 7B shows an embodiment of the second panel in a side view.
Figure 7C:
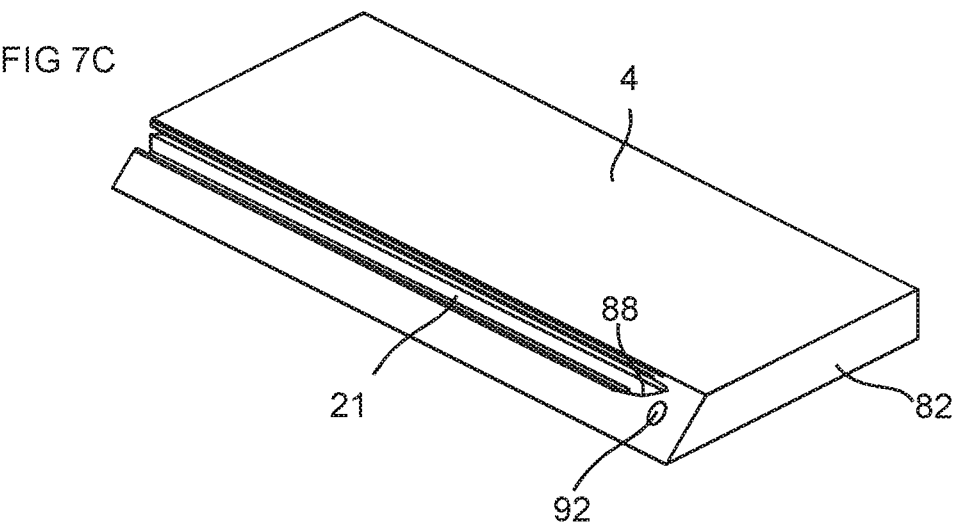
FIG. 7C shows an embodiment of the second panel in a 3D view.

FIG. 7A-C shows an embodiment of the second panel in a bottom view, in a side view, and in a 3D view, respectively. The edge groove 21 may extend along essentially the entire length of the second edge in a longitudinal direction of the second edge and end at a front end 88 at a distance from a front edge 82 of the second panel 4. The dowel groove 92 may be positioned at distance from the front edge 82 of the second panel 4. The dowel groove 92 may be positioned between the front end 88 of the edge groove 21 and the front edge 82 of the second panel 4.

Figure 8:
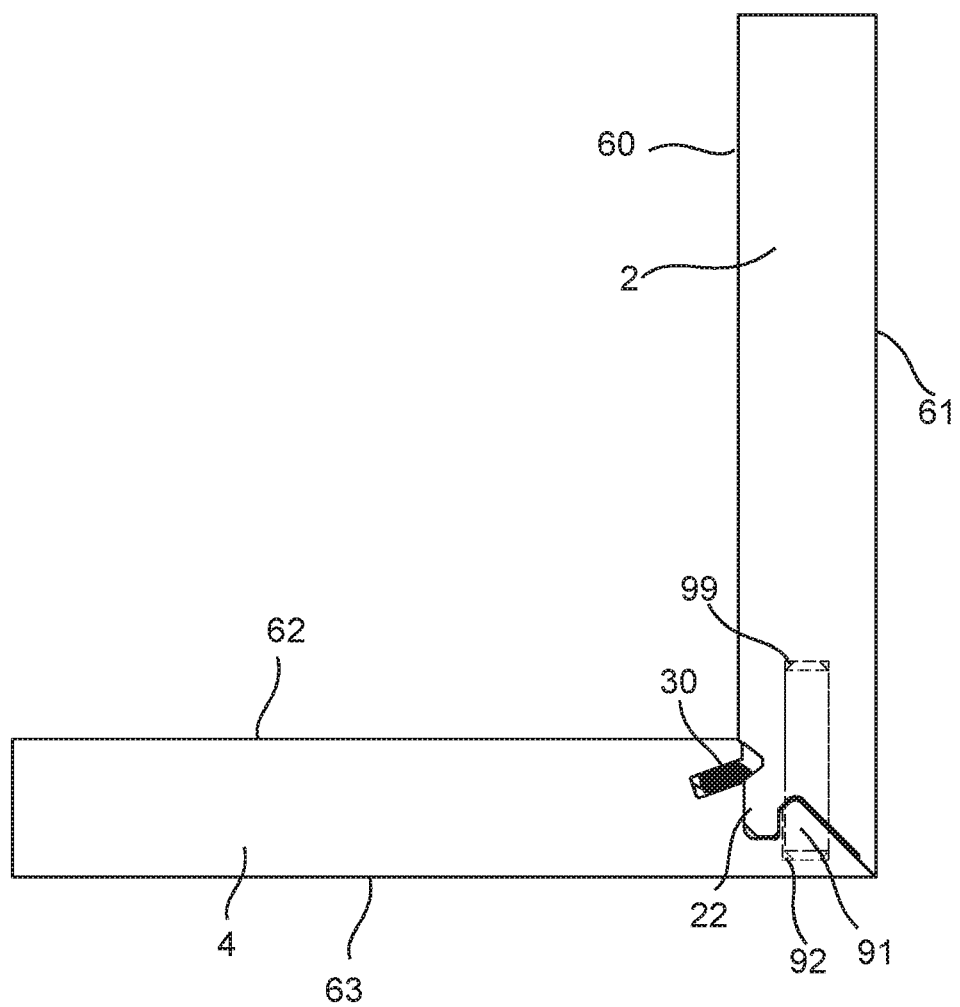
FIG. 8 shows an embodiment of the first panel and the second panel locked together with an embodiment of the mechanical locking device.
Figure 9:
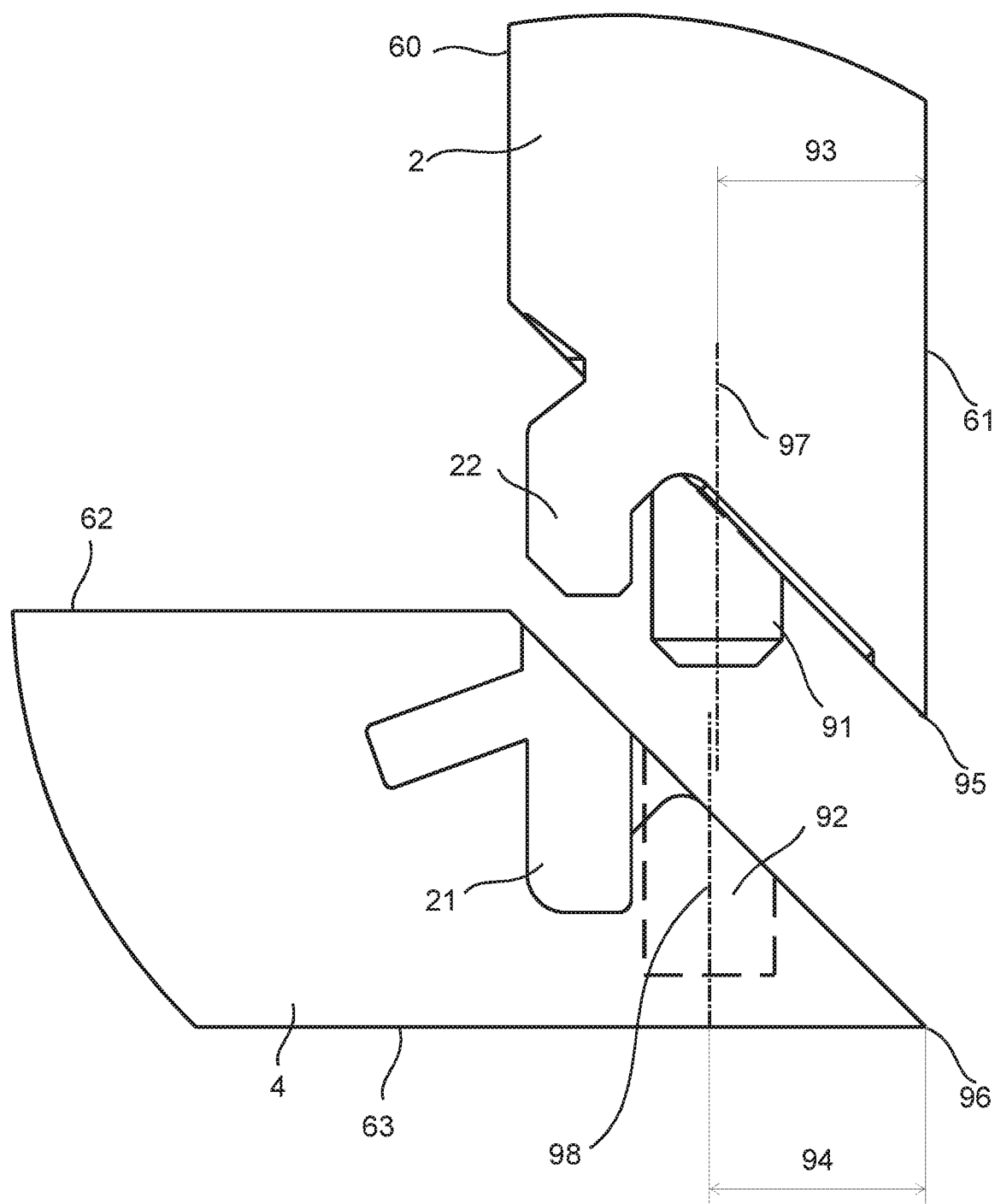
FIG. 9 shows an enlargement of a corner part of an embodiment of the first panel and the second panel, without the flexible tongue 30, before assembling.
Figure 10:
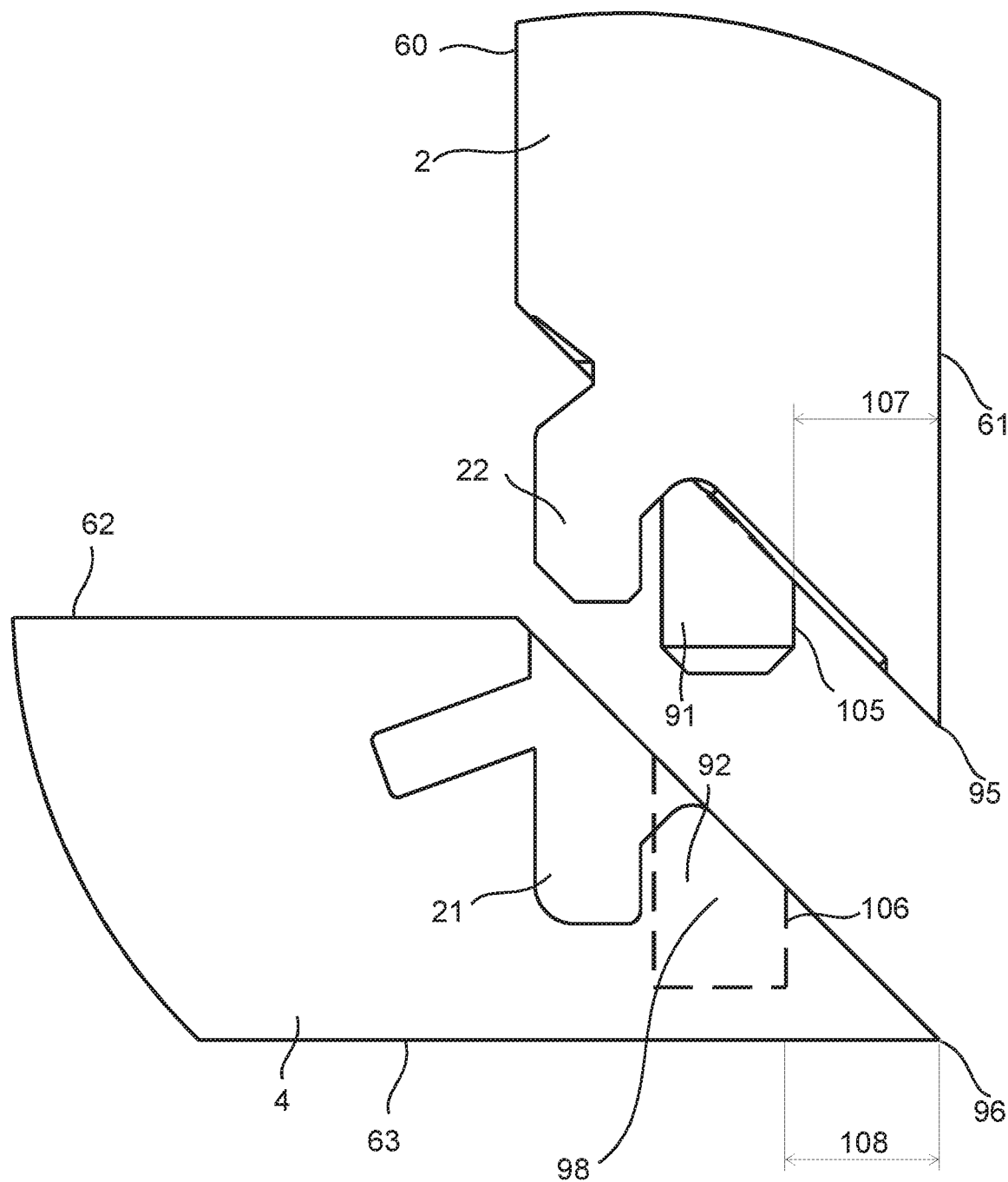
FIG. 10 shows an enlargement of a corner part of an embodiment of the first panel and the second panel, without the flexible tongue 30, before assembling.

FIG. 8 shows an embodiment of the first panel and the second panel locked together with an embodiment of the mechanical locking device and FIGS. 9 and 10 shows an enlargement of a corner part of an embodiment of the first panel and the second panel without the flexible tongue 30, before assembling.

The embodiment shown in FIG. 6-8 comprises a first panel with a first main plane and a second panel with a second main plane, wherein the first and the second panel comprises a mechanical locking device which is configured for locking a first edge of the first panel 2 to a second edge of the second panel 4 at a junction plane J. The first main plane is essentially perpendicular to the second main plane and the junction plane is extending between the first main plane and the second main plane. The mechanical locking device comprises at the first edge an edge tongue 22 which extends from the junction plane J and at the second edge comprises an edge groove 21 at the junction plane. The edge tongue is configured to cooperate with the edge groove for locking together the first and the second edges in a first direction D1 which is perpendicular to the first main plane.

FIG. 9 shows an embodiment of the mechanical locking device which comprises a dowel 91 at the first edge and a dowel groove 92 at the second edge, wherein the dowel 91 is configured to cooperate with the dowel groove 92. A centreline 97 of the dowel 91 is positioned at a first distance 93 in the first direction from an outer corner 95 of the first panel 2. The dowel groove 92 is positioned at a second distance 94 in the first direction from an outer corner 96 of the second panel 4, and the second distance 94 is greater than the first distance 93.

A difference between the second distance 94 and the first distance 93 may be within the range of about 0.1 mm to about 0.5 mm, or is about 0.3 mm.

FIG. 10 shows an embodiment of the mechanical locking device which comprises a dowel 91 at the first edge and a dowel groove 92 at the second edge. An outer surface 105 of the dowel 91 is configured to cooperate with an outer surface 106 of the dowel groove 92. The outer surface 105 of the dowel 91 is positioned at a third distance 107 in the first direction from an outer corner 95 of the first panel 2. The outer surface 106 of the dowel groove 92 is positioned at a fourth distance 108 in the first direction from an outer corner 96 of the second panel 4, and the fourth distance 108 is greater than the third distance 107.

The outer surface 105 of the dowel 91 may be parallel to the outer surface 61 of the first panel 2.

The outer surface 105 of the dowel 91 may be the surface of the dowel which is closest, in the first direction, the outer corner 95 of the first panel 2.

The outer surface 106 of the dowel groove 92 may be perpendicular to the outer surface 63 of the second panel 4.

The outer surface 106 of the dowel groove 92 may be the surface of the dowel groove which is closest, in the first direction, the outer corner 96 of the second panel 4.

A difference between the fourth distance 108 and the third distance 107 may be within the range of about 0.1 mm to about 0.5 mm, or is about 0.3 mm The dowel 91 may be attached to another dowel groove 99 at the first edge.

The dowel may be attached to the dowel groove 92 at the second edge before the first 2 and the second 4 panels are assembled and locked together with the mechanical locking device. Thus, the dowel is, in this embodiment, inserted in said another dowel groove 99, at the first edge, during the assembling.

The dowel 91 may be of a cylindrical shape. The diameter may be in the range of about 5 mm to about 8 mm.

The dowel groove 92 and/or the said another dowel groove 99 may be of an essentially cylindrical shape, such as a drill hole or a bottomed drill hole. The diameter may be in the range of about 5 mm to about 8 mm The dowel 91 may be made from one or more of a wood based material, a polymer material, preferably with a reinforcement, such as glass fibre or a metal.

The edge tongue 22 may be formed of a core material of the first panel and or at least partly in a surface layer of the first panel. The edge groove 21 may be formed of a core material of the second panel and/or at least partly in a surface layer of the second panel. The edge tongue 22 may formed of material separate from the core material of the first panel. The edge groove 21 may be formed of a material separate from the core material of the second panel.

The edge tongue 22 may comprises a tongue groove 10 and the edge groove 21 may comprise a flexible tongue 30, preferably arranged in an insertion groove 20, and wherein said flexible tongue is configured to cooperate with the tongue groove 10 for locking together the first and the second edges in a second direction D2 which is perpendicular to the second main plane.

The angle between the junction plane and the first main plane may be about 45°.

The edge tongue 22 may extend, from the junction plane, essentially in the second direction.

The edge tongue 22 may extend along essentially the entire length of the first edge in a longitudinal direction of the first edge and ends at a distance from a front edge 81 of the first panel 2.

The dowel 91 may be positioned between the front edge 81 of the first panel 2 and the edge tongue 22.

The edge groove 21 may extend along essentially the entire length of the second edge in a longitudinal direction of the second edge and ends at a distance from a front edge 82 of the second panel 4.

The flexible tongue 30 may be displaceable in the insertion groove.

The locking device is preferably configured such that the flexible tongue 30 moves out of the tongue groove 10 when a tool is inserted into the tongue groove and pushed back into the insertion groove.

The insertion groove 20 may be parallel to the second main plane or at an acute angle 75 to the second main plane, such that a bottom of the insertion groove 20 is at a greater distance from an inner face 62 of the second panel than an opening of the insertion groove to the edge groove.

The locking device may comprise a bevel or rounding at an opening of the tongue groove. This may facilitate disassembling as the bevel or the rounding may prevent the flexible tongue from getting stuck during the disassembling.

The set of panels as described above may be a part of an assembled furniture product, such as a corner of a frame. The tongue groove 10 may be open at a backside of the furniture, such that a tool may be inserted into the tongue groove to push back the flexible tongue 30 into the insertion groove 20 and unlock the locking device.

A core material of the first and the second panel may comprise a wood fibre based board, such as a HDF, MDF, plywood, solid wood or particleboard, or a reinforced plastic board or a wood fibre composite board. The core may be provided with a decorative layer. Parts of the locking device may be formed, preferably by mechanical cutting, such as milling, of material of the first and the second panel.

Figure 4A:
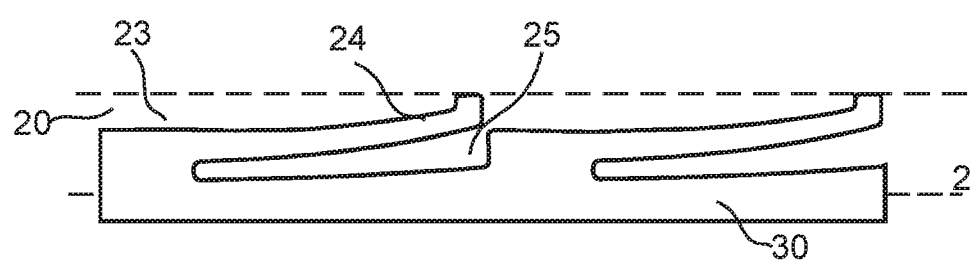
FIGS. 4A-4F show a part of an embodiment of the invention comprising an embodiment of the flexible tongue.
Figure 4B:
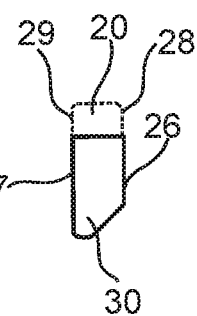
Figure 4C:
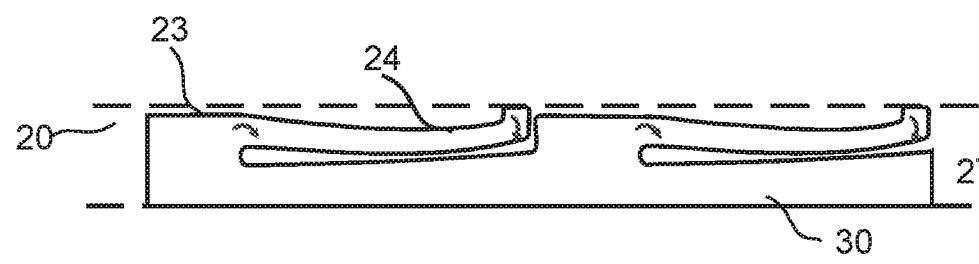
Figure 4D:
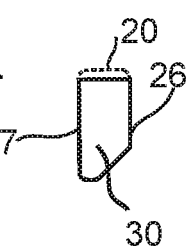

An embodiment of the flexible tongue 30, which is displaceable in an insertion groove 20, is shown in FIGS. 4A-4D. FIGS. 4A-4B show the flexible tongue 30 in a locked position and FIGS. 4C-4D show the flexible tongue 30 during assembling of the first panel 2 and the second panel 4. FIG. 4B shows a cross section of the flexible tongue 30 in FIG. 4A. FIG. 4D shows a cross section of the flexile tongue 30 in FIG. 4C. The flexible tongue 30 comprises bendable protruding parts 24. A space 23 is provided between the flexible tongue 30 and a bottom wall of the insertion groove 20. FIG. 4C shows that the flexible tongue 30 is pushed into the insertion groove 20 and towards the bottom wall of the insertion groove 20 during an assembly of the first panel 2 with the second panel 4. The flexible tongue 30 springs back toward its initial position when the first panel 2 and the second panel 4 have reached a locked position. A recess 25 is preferably arranged at each bendable protruding part.

The flexible tongue 30 may have a first displacement surface 26 and an opposite second displacement surface 27, configured to be displaced along a third displacement surface 28 and a fourth displacement locking surface 29, respectively, of the insertion groove 20.

Figure 4E:
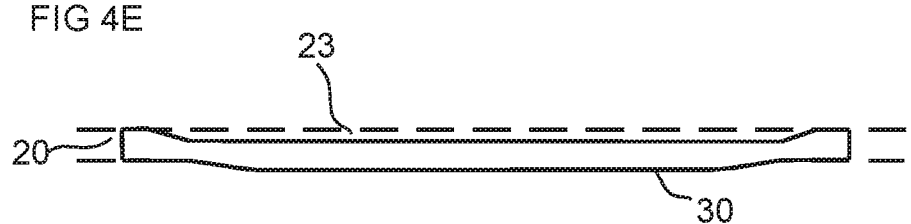
Figure 4F:
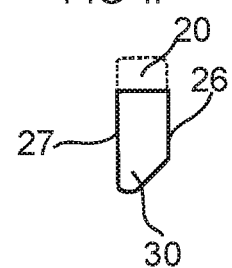

An alternative embodiment of the flexible tongue 30, without the protruding bendable parts 24, is shown in FIGS. 4E-4F. FIG. 4F shows a cross section of the flexible tongue 30 shown in FIG. 4E. The alternative embodiment is bendable in its length direction in order to accomplish the same function as the embodiment shown in FIGS. 4A-4D.

The invention claimed is:

1. A set of panels comprising a first panel with a first main plane and a second panel with a second main plane, wherein the first and the second panel comprises a mechanical locking device which is configured for locking a first edge of the first panel to a second edge of the second panel at a junction plane such that a first outer corner of the first panel and a second outer corner of the second panel contact one another when the first edge and the second edge are locked at the junction plane, wherein the first main plane is essentially perpendicular to the second main plane and the junction plane is extending between the first main plane and the second main plane, wherein the mechanical locking device comprises:

at the first edge, an edge tongue which extends from the junction plane; and at the second edge, an edge groove at the junction plane, wherein the edge tongue is configured to cooperate with the edge groove for locking together the first and the second edges in a first direction which is perpendicular to the first main plane, wherein the mechanical locking device comprises a dowel at the first edge and a dowel groove at the second edge, the dowel is configured to cooperate with the dowel groove, a first centerline of the dowel is positioned at a first distance in the first direction from the first outer corner of the first panel when the first edge and the second edge are locked at the junction plane, a second centerline of the dowel groove is positioned at a second distance in the first direction from the second outer corner of the second panel when the first edge and the second edge are locked at the junction plane, and the second distance is greater than the first distance.

2. The set as claimed in claim 1, wherein a difference between the second distance and the first distance is within the range of about 0.1 mm to about 0.5 mm.

3. The set as claimed in claim 1, the dowel is attached to another dowel groove at the first edge.

4. The set as claimed in claim 1, wherein the dowel is of a cylindrical shape.

5. The set as claimed in claim 1, wherein the dowel made from one or more of a wood based material, a polymer material, or a metal.

6. The set as claimed in claim 1, wherein edge tongue is formed of a core material of the first panel and/or the edge groove is formed of a core material of the second panel.

7. The set as claimed in claim 1, wherein the edge tongue comprises a tongue groove and the edge groove comprises a flexible tongue, and wherein said flexible tongue is configured to cooperate with the tongue groove for locking together the first and the second edges in a second direction which is perpendicular to the second main plane.

8. The set as claimed in claim 1, wherein the angle between the junction plane and the first main plane is about 45°.

9. The set as claimed in claim 1, wherein edge tongue extends, from the junction plane, essentially in the second direction.

10. The set as claimed in claim 1, wherein the edge tongue extends along essentially the entire length of the first edge in a longitudinal direction of the first edge and ends at a distance from a front edge of the first panel.

11. The set as claimed in claim 1, wherein the dowel is positioned between the front edge of the first panel and the edge tongue.

12. The set as claimed in claim 1, wherein the edge groove extends along essentially the entire length of the second edge in a longitudinal direction of the second edge and ends at a distance from a front edge of the second panel.

13. A set of panels comprising a first panel with a first main plane and a second panel with a second main plane, wherein the first and the second panel comprises a mechanical locking device which is configured for locking a first edge of the first panel to a second edge of the second panel at a junction plane such that a first outer corner of the first panel and a second outer corner of the second panel contact one another when the first edge and the second edge are locked at the junction plane, wherein the first main plane is essentially perpendicular to the second main plane and the junction plane is extending between the first main plane and the second main plane, wherein the mechanical locking device comprises:

at the first edge, an edge tongue which extends from the junction plane; and at the second edge, an edge groove at the junction plane, wherein the edge tongue is configured to cooperate with the edge groove for locking together the first and the second edges in a first direction which is perpendicular to the first main plane, wherein the mechanical locking device comprises a dowel at the first edge and a dowel groove at the second edge, the dowel is configured to be inserted in the dowel groove when the first edge and the second edge are locked at the junction plane, and a first centerline of the dowel is noncollinear with a second centerline of the dowel groove when the first edge and the second edge are locked at the junction plane.

* * * * *